United States Patent [19]

Nagel

[11] Patent Number: 5,298,233
[45] Date of Patent: Mar. 29, 1994

[54] METHOD AND SYSTEM FOR OXIDIZING HYDROGEN- AND CARBON-CONTAINING FEED IN A MOLTEN BATH OF IMMISCIBLE METALS

[75] Inventor: Christopher J. Nagel, Wayland, Mass.

[73] Assignee: Molten Metal Technology, Inc., Waltham, Mass.

[21] Appl. No.: 963,306

[22] Filed: Oct. 16, 1992

Related U.S. Application Data

[60] Continuation-in-part of Ser. No. 827,373, Jan. 29, 1992, abandoned, which is a division of Ser. No. 557,561, Jul. 24, 1990, Pat. No. 5,177,304.

[51] Int. Cl.$^5$ .............................. C01B 3/02; C01B 5/00
[52] U.S. Cl. .................................. 423/580.1; 422/129; 422/189; 423/648.1; 423/DIG. 12; 588/201
[58] Field of Search ................. 423/DIG. 12, 648.1, 423/580, 580.1; 588/201; 422/129, 189

[56] References Cited

U.S. PATENT DOCUMENTS

| | | | |
|---|---|---|---|
| 2,647,045 | 7/1953 | Rummel. | |
| 2,923,260 | 2/1960 | Rummel. | |
| 2,953,445 | 9/1960 | Rummel. | |
| 3,647,358 | 3/1972 | Greenberg | 23/2 R |
| 3,668,120 | 6/1972 | Patterson | 210/60 |
| 3,744,438 | 7/1973 | Southwick | 110/8 E |
| 3,812,620 | 5/1974 | Titus et al. | 48/65 |
| 3,969,490 | 7/1976 | de Beuckelaer et al. | 423/481 |
| 4,017,271 | 4/1977 | Barclay et al. | 48/197 R |
| 4,187,672 | 2/1980 | Rasor | 60/39.12 |
| 4,244,180 | 1/1981 | Rasor | 60/39.04 |
| 4,246,255 | 1/1981 | Grantham | 423/659 |
| 4,345,990 | 8/1982 | Fahlstrom et al. | 208/11 R |
| 4,447,262 | 5/1984 | Gay et al. | 75/65 R |
| 4,537,626 | 8/1985 | Pfeiffer et al. | 75/35 |
| 4,574,714 | 3/1986 | Bach et al. | 110/346 |
| 4,602,574 | 7/1986 | Bach et al. | 110/346 |
| 4,848,250 | 7/1989 | Wunderley | 110/235 |
| 5,191,154 | 3/1993 | Nagel | 588/201 |

*Primary Examiner*—Wayne Langel
*Attorney, Agent, or Firm*—Hamilton, Brook, Smith & Reynolds

[57] ABSTRACT

A method and a system for catalytically converting a hydrogen component in a hydrogen- and carbon-containing feed to dissolved hydrogen and for oxidizing the dissolved hydrogen to water is disclosed. Hydrogen- and carbon-containing feed, such as municipal garbage, low grade fuel oil and organic or inorganic sludge, is introduced to a molten bath system. The molten bath system includes first and second immiscible molten metal phases. Carbon and hydrogen component in the feed are converted to dissolved carbon and dissolved hydrogen, respectively. The dissolved carbon is oxidized in the first molten metal phase to carbon monoxide, which then migrates out of the first molten metal phase. As dissolved hydrogen accumulates in the first molten metal phase, it nucleates and migrates to the second molten metal phase, where it is oxidized and forms water vapor.

20 Claims, 2 Drawing Sheets

METHOD AND SYSTEM FOR OXIDIZING HYDROGEN- AND CARBON-CONTAINING FEED IN A MOLTEN BATH OF IMMISCIBLE METALS

RELATED APPLICATIONS

This is a continuation-in-part of U.S. Ser. No. 07/827,373, filed Jan. 29, 1992, abandoned, which is a divisional of U.S. Ser. No. 07/557,561, filed Jul. 24, 1990, U.S. Pat. No. 5,177,304.

BACKGROUND OF THE INVENTION

The Environmental Protection Agency (EPA) has estimated that the annual generation of hazardous wastes in the United States to be in excess of seventy billion gallons. Hazardous wastes include organic materials, such as polychlorinated biphenyls, pesticides, herbicides, municipal garbage, hospital wastes including pathogens, paints, inks and contaminated solvents, black liquor and explosives. Examples of inorganic wastes which are a serious environmental problem include oxides of iron, zinc, copper, lead, magnesium, aluminum, chromium and cadmium, various powdered metal manufacturing residues and metal-containing sludges.

Further, the EPA classified as toxic, ignitable, corrosive or dangerously reactive many common waste materials, such as paint sludge from appliance factories, dregs of chrome and nickel from metal plating shops, spent raw materials for varnish, carpets and detergents at chemical plants, solvents from dry-cleaned clothes and degreased microchips from computers, mercury from exhausted watch batteries, butane residue from disposable cigarette lighters and lye from cans of oven cleaners.

Landfills are becoming less available as a means of disposing of such wastes. In the absence of suitable landfills, hazardous wastes must be transformed to benign and preferably useful substances. There has been tremendous investment in development of alternative methods of treating hazardous wastes. Various types of reactors which have been employed for decomposition of hazardous wastes include for example, rotary kiln, liquid injection, multiple hearth, multiple chamber, fluidized bed, molten salt and high efficiency boilers.

A common reactor for pyrolytic and combustive destruction of organic wastes is the rotary kiln. Pyrolysis in rotary kilns typically is initiated by a high temperature flame. The reactive species generated by the flame are then oxidized by contact with oxygen. However, because the waste material is often highly viscous, it is generally difficult to contact reactive species with oxygen for combustion of the reactive species. The rate of destruction of the waste, therefore, can be impeded. Moreover, heat released by combustion occurs away from the flame tip as reacting materials are fed through the rotary kiln, thereby limiting the heat which can be utilized for the initial pyrolysis step.

Titus et al., U.S. Pat. No. 3,812,620, disclose a molten pool of glass and miscellaneous metals formed during incineration of "heterogenous waste materials," such as municipal garbage. Various organics in the waste materials are pyrolyzed in the molten pool at temperatures of up to 10,000° F. However, the decomposed materials are not contacted with oxygen introduced into the molten pool.

Rummel, U.S. Pat. Nos. 2,647,045, 2,923,260 and 3,953,445, disclose molten slag bath formed from reduction of iron ore or from the "non-combustible residues of coal products." Finely divided coal is injected into the bath and separate addition of air is conducted with "an endothermic reactant," i.e., water. The process is preferably conducted in two separate endothermic and exothermic zones.

Rassor et al., U.S. Pat. Nos. 4,187,672 and 4,244,180 disclose molten iron employed as a solvent for carbon generated by thorough topside introduction of coal. The coal is then partially oxidized by iron oxide and by introduction of oxygen from above. However, carbonization and oxidation are conducted in distinct carbonization and oxidation chambers.

Molten salt processes are also known, and are typified by the reaction of alkali metal carbonates in a basic, or caustic, molten bath into which oxygen and wastes are injected. However, such baths generally rely principally upon thermal distribution rather than chemical reaction to degrade waste materials. See, for example, U.S. Pat. Nos. 4,447,262, 4,246,255 and 4,017,271.

Large scale destruction of PCBs can be done in large scale high efficiency boilers by their addition to conventional fuel in amounts up to 5%. See "Destruction of High Concentration PCBs in a Utility Boiler," by Siedhoff, Zale and Morris, Proceedings of the 1983 PCB Seminar, Electric Power Research Institute. However, the long-term corrosion and other effects on such high efficiency boilers is largely unknown.

Oxidation of wastes by reaction of organic materials and oxygen in the presence of water at high temperature and pressure is another alternative method of disposal. See, Wilhelmi, A. R. and Knoop, P. V., "Wet Air Oxidation—An Alternative to Incineration," Chemical Engineering Progress, 75:46–52 (1979). However, inorganic salts, char and metal-containing solids can accumulate at the walls of apparatus employed for such methods, thus necessitating removal of accumulated deposits, causing corrosion and limiting the operating capacity and useful life of such apparatus.

Bach et al, U.S. Pat. Nos. 4,574,714 and 4,602,574 disclose a unitary process wherein organic and inorganic wastes are injected conjointly with oxygen into a molten metal bath. The molten metal bath is comprised of metals and oxides of metals having free energies of oxidation under the conditions of the molten metal bath which are greater than the free energy of oxidation of carbon to carbon monoxide. The waste materials are pyrolytically decomposed and oxidized in the presence of the molten metal bath to form carbon monoxide. The carbon monoxide can be oxidized by contact with oxygen gas introduced into the molten metal bath.

SUMMARY OF THE INVENTION

The present invention relates to a new method and to a new system for converting a hydrogen component in a hydrogen- and carbon-containing feed to dissolved hydrogen and for oxidizing the dissolved hydrogen to form water.

The method includes introducing the feed to a molten bath system having a first molten metal phase for converting hydrogen and carbon components in the feed to dissolved hydrogen and dissolved carbon. The first molten metal phase includes a first metal having a free energy of oxidation, at the molten bath system conditions, which is less than that of the oxidation of hydrogen to form water. The molten bath system also includes a second molten metal phase for oxidizing the dissolved hydrogen, formed in the first molten metal phase, to form water. The second molten metal phase is substantially immiscible in the first molten metal phase and is in contact with the first molten metal phase. The second molten metal phase is also distributed, relative to the first molten metal phase, to cause a substantial portion of the dissolved hydrogen formed in the first molten metal phase to migrate to the second molten metal phase. The second molten metal phase includes a second metal having a free energy of oxidation, at the molten bath system conditions, which is greater than that of the oxidation of hydrogen to form water, and has a solubility for carbon which is lower than that of the first molten metal phase. The first molten metal phase causes a greater amount of the carbon component in the feed to be converted to dissolved carbon in the molten bath system than in a molten bath of about equal volume to that of the molten bath system, but which includes only the second molten metal phase. Conversion of the carbon in the first molten metal phase increases the rate of conversion of the hydrogen component of the feed in the molten bath system to dissolved hydrogen. An oxidant is introduced to the first molten metal phase and to the second molten metal phase of the molten bath system at a rate which is sufficient to cause the carbon in the first molten metal phase to be oxidized to form a carbon oxide gas, such as carbon monoxide and/or carbon dioxide gas. At least a substantial portion of the carbon component in subsequent feed converts to dissolved carbon in the first molten metal phase. The rate at which oxidant is introduced is also sufficient to cause hydrogen in the second molten metal phase to oxidize and form water, whereby dissolved hydrogen in the first molten metal phase will migrate to the second molten metal phase for subsequent oxidation, thereby converting the hydrogen component in the hydrogen- and carbon-containing feed to dissolved hydrogen and then oxidizing the dissolved hydrogen to form water.

The apparatus includes a vessel and a molten bath system, which is disposed in the vessel. The molten bath system is the same as that employed in the method of the invention. Suitable means introduce an oxidant into the first molten metal phase and the second molten phase of the molten bath system at a rate which is sufficient to cause the carbon in the first molten metal phase to be oxidized to form a carbon oxide gas, whereby at least a substantial portion of the carbon component in subsequent feed will convert to dissolved carbon in the first molten metal phase. The rate is also sufficient to cause hydrogen in the second molten metal phase to oxidize and form water, whereby dissolved hydrogen in the first molten metal phase will migrate to the second molten metal phase for subsequent oxidation. The hydrogen component in the hydrogen- and carbon-containing feed is thereby converted to dissolved hydrogen and the dissolved hydrogen is oxidized to form water. Suitable means then remove the water formed in the molten bath system from the vessel.

This invention has many advantages. Dissolved species of atomic constituents, including atomic free radicals of hydrogen and carbon and diatomic hydrogen ($H_2$), are formed from hydrogen- and carbon-containing feed materials. At least a portion of the dissolved species are converted by exothermic reaction to form relatively stable compounds, such as carbon dioxide and water. The heat generated by the exothermic reaction can be sufficient to cause the metals of the molten bath to catalytically convert atomic constituents of additional hydrogen- and carbon-containing feed to their respective dissolved species. The dissolved species can also directly contribute to formation of other dissolved species from the hydrogen- and carbon-containing feed. Enough heat can also be generated by the exothermic reaction to transfer heat from the molten bath for other uses, such as for generation of electrical power.

Immiscible metals in the molten bath allow selection of combinations of metals according to relative solubility and free energies of oxidation, whereby reaction of dissolved species can thereby be controlled to form relatively stable compounds. Chemical energy, mass and thermal energies can be transferred within the molten metal bath to form thermodynamically stable compounds at the conditions specified by each phase of the molten metal bath specifying the reaction system Further, the conversion to stable compounds can be substantially complete, thereby preventing emission of significant amounts of toxic emissions to the atmosphere. Also, high solubility of the compounds formed in the molten bath permits collection of significant amounts of these compounds in the molten bath. Many of the compounds formed can be disposed of by their nonleachable incorporation into a crystallographic matrix of a vitreous layer disposed over the metal bath. Gaseous emissions of deleterious compounds can thereby be substantially reduced.

DETAILED DESCRIPTION OF THE INVENTION

The features and other details of the method of the invention will now be more particularly described with reference to the accompanying drawings and pointed out in the claims. It will be understood that the particular embodiments of the invention are shown by way of illustration and not as limitations of the invention. The principle function of this invention can be employed in various embodiments without departing from the scope of the present invention.

Figure 1:
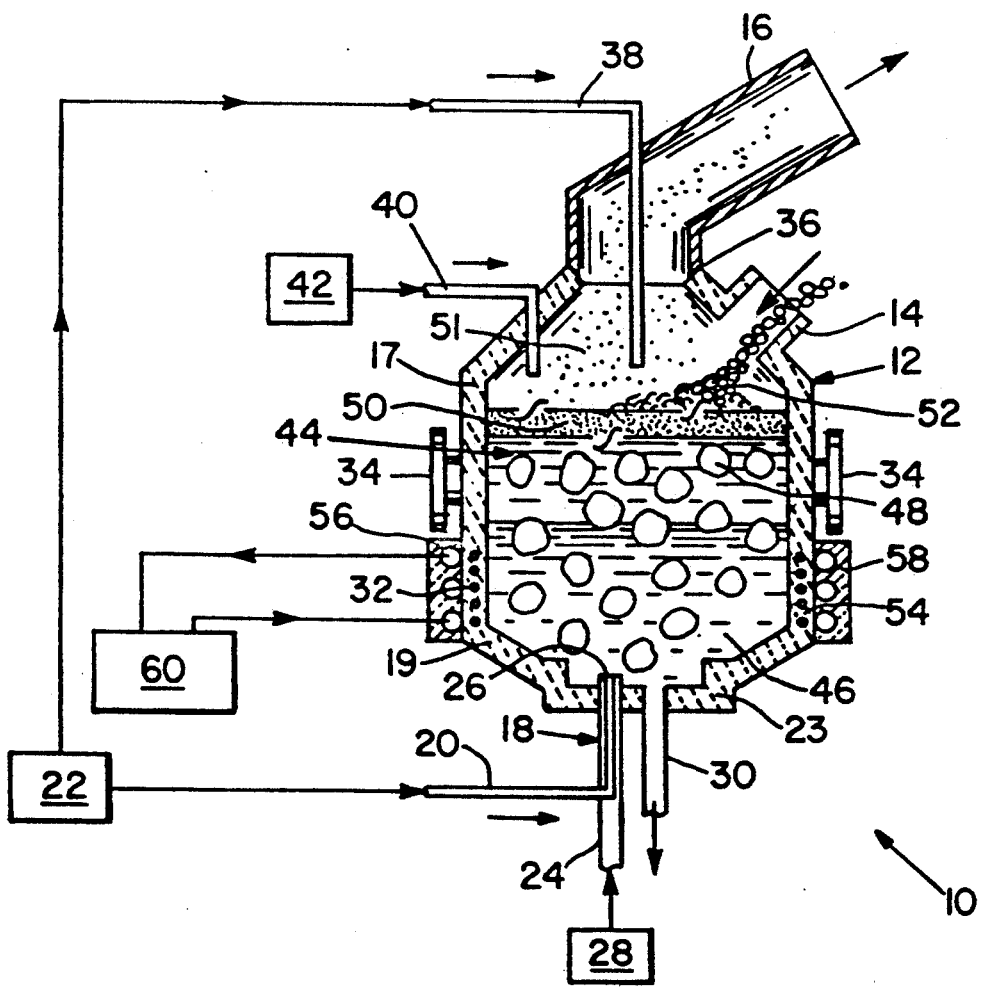
FIG. 1 is a schematic representation of one embodiment of the apparatus of the present invention.

The present invention generally relates to a method and system for extracting atomic constituents from a carbon-containing feed and for converting the atomic constituents to thermodynamically stable forms in a molten metal bath. Bach et al. U.S. Pat. Nos. 4,754,714 and 4,602,574 disclose a molten metal bath, such as is used in a steelmaking facility, which destroys polychlorinated biphenyls and other organic wastes, optionally together with inorganic wastes. Nagel, U.S. patent application Ser. No. 07/557,561, filed Jul. 24, 1990, discloses a method and system for forming carbon dioxide from carbon-containing materials in a molten metal bath of immiscible metals. Nagel, U.S. patent application Ser. No. 07/737,048, filed Jul. 29, 1991, discloses a method and system for controlling chemical reaction in a molten metal bath. Nagel et al., U.S. patent application Ser. No. 07/737,199, filed Jul. 29, 1991, discloses a method and system of formation of oxides of dissolved atomic constituents in a molten metal bath. Nagel et al., U.S. patent application Ser. No. 07/879,978, filed May 5, 1992, discloses a method for chemically reducing metals in waste compositions. Nagel et al., U.S. patent application Ser. No. 07/788,804, filed Nov. 7, 1991, discloses a method and system for reducing the volume of radioactive compositions. Nagel et al., U.S. patent application Ser. Nos. 07/895,358 and 07/895,346, filed Jun. 8, 1992, both disclose methods and apparatus for forming enriched hydrogen and carbon oxide gas streams from organic material in molten baths. Nagel, U.S. patent application Ser. No. 07/827,373, which is a divisional of 07/557,561, and of which the present application is a continuation-in-part, discloses a method and apparatus for catalytically converting hydrogen in a hydrogen- and carbon-containing feed to monatomic hydrogen and for oxidizing the monatomic hydrogen to form water. The teachings of U.S. Pat. Nos. 4,754,714 and 4,602,574, and of U.S. patent applications Ser. Nos. 07/557,561, 07/737,048, 07/737,199, 07/788,804, 07/879,978, 07/895,358, 07/895,346, and 07/827,373 are incorporated herein by reference In one embodiment of the present invention, apparatus 10 is illustrated in FIG. 1 Apparatus 10 includes vessel 12. Vessel 12 includes feed inlet 14. Vessel 12 is constructed of a suitable material, as is known in the art. Feed inlet 14 is suitable for directing a suitable hydrogen- and carbon-containing feed into vessel 14. Hot gas off-take 16 extends from an open portion 17 of vessel 12 and is suitable for directing hot gas from vessel 12 to a suitable treatment means, not shown, for treating gases formed by the method of the invention.

Tuyere tube 18 includes an oxygen inlet tube 20 providing fluid communication between oxidant source 22 and lower portion 23 of vessel 12. Feed gas source tube 24 of tuyere tube 18 provides fluid communication between feed gas source 28 and vessel 12. Tuyere tube 18 is dimensioned and configured for continuously introducing a suitable hydrogen- and carbon-containing feed gas and oxidant into vessel 12. It is to be understood, however, that the feed gas and oxidant can be introduced to vessel 12 intermittently, rather then continuously. It is also to be understood that more than one tuyere tube 18 can be disposed in vessel 12 and can be of any suitable configuration to achieve desired blowing, such as is known in the art. Second oxidant inlet tube 38 extends between oxidant source 22 and upper portion 17 of vessel 12.

Bottom drain 30 extends from vessel 12 and is suitable for removal of molten metal from vessel 12. Additional drains may be provided as a means of removing continuously, or discretely, additional phases. Induction coil 32 is disposed at vessel 12 for sufficiently heating vessel 12 to initiate and/or provide heat during the method of the present invention. It is to be understood that vessel 12 can alternately be heated by other means, such as oxyfuel burners positioned above the bath, electric arc, etc. Trunions 34 can be disposed at vessel 12 for manipulation of vessel 12. Seal 36 is disposed between vessel 12 and hot gas off-take 16 and is suitable for allowing partial rotation of vessel 12 about trunions 34 without breaking seal 36 of hot gas off-take 16.

Examples of suitable vessels, fitted with appropriate injection means, include top and bottom-blown basic oxygen process reactors (K-BOP and Q-BOP, respectively), argon-oxygen decarbonization furnace (AOD), electric arc furnaces (EAF), etc. which have been fitted with a suitable means for top and bottom injection and top charging, such as is known in conventional steelmaking practices.

Molten bath system 44 is disposed within vessel 12. Molten bath system 44 includes a first molten metal phase 46. First molten metal phase 46 comprises a first metal, or solution of metals, having a free energy of oxidation, at molten bath system 44 conditions, which is less than that of the oxidation of hydrogen to form water, and greater than that of oxidation of carbon to form a carbon oxide, such as carbon monoxide or carbon dioxide. Carbon (monatomic carbon) has a significant solubility in first molten metal phase 46.

Examples of suitable metals in first molten metal phase 46 can include iron, chromium, manganese, etc. It is to be understood that first molten metal phase 46 can include more than one metal. For example, first molten metal phase 46 can include a solution of metals in which the carbon has significant solubility. Also, it is to be understood that first molten metal phase 46 can comprise oxides of the metal in first molten metal phase 46.

In one embodiment, the first metal is iron (Fe). A dynamic carbon balance is maintained at about $\frac{1}{2}\%$ carbon to about 6% carbon, preferably about 2% to about 3%, across the first molten metal phase, when the first metal is iron, by controlled introduction of a suitable feed and an oxidant.

Molten bath system 44 also includes second molten metal phase 48. Second molten metal phase 48 is substantially immiscible in first molten metal phase 46. Second molten metal phase 48 comprises a metal having a free energy of oxidation, at molten bath system 44 conditions, which is greater than that of the oxidation of hydrogen to form water. The solubility of carbon in second molten metal 48 is less than in first molten metal phase 46. In one embodiment, the solubility of carbon in the second molten metal phase is in the range of up to about one percent by weight.

Examples of suitable metals in second molten metal phase 48 include copper, nickel, cobalt, etc. It is to be understood that second molten metal phase 48 can include more than one metal. For example, second molten metal phase 48 can include a solution of metals, in which carbon is less soluble than in first molten metal phase 46. Also, it is to be understood that second molten metal phase 48 can comprise oxides of the metal in second molten metal phase 48.

Molten bath system 44 can be formed by at least partially filling vessel 12 with suitable metals for first molten metal phase 46 and second molten metal phase 48. The metals are then heated to a suitable temperature by activating induction coil 32 or by other means, not shown. The metals melt during heating and separate to form first molten metal phase 46 and second molten metal phase 48. Reactant addition may be necessary to achieve phase immiscibility. In one embodiment, the viscosity of molten bath system 44 is no greater than about 10 centipoise. It is to be understood, however, that more than two molten metal phases can be formed. The number of molten metal phases and the metals in the molten metal phases can be selected for transport of heat, mass and chemical energy between molten metal phases to form suitable compounds which are thermodynamically stable at the conditions of molten bath system 44.

Suitable system conditions of molten bath system 44 include a temperature and oxygen partial pressure within molten bath system 44 which are sufficient to cause the free energy of oxidation of metal in first molten metal phase 46 to be less than that of oxidation of hydrogen to form water and greater than that of oxidation of carbon to form carbon monoxide or carbon dioxide. The temperature and oxygen partial pressure are also sufficient to cause the free energy of oxidation of metal in second molten metal phase 48 to be greater than that of oxidation of hydrogen to form water. The temperature of molten bath system 44 is also sufficient to cause molten bath system 44 to be fluid and to cause molten bath system 44 to catalytically convert hydrogen and carbon components of a suitable feed to dissolved hydrogen and dissolved carbon.

In one embodiment, vitreous layer 50 is disposed on molten bath system 44. Vitreous layer 50 is substantially immiscible in molten bath system 44. Vitreous layer 50 has a solubility for hydrogen which is less than that of first molten metal phase 46, to thereby retain dissolved hydrogen within molten bath system 44.

The solubility of carbon and of carbon monoxide in vitreous layer 50 can be less than that of second molten metal phase 48 to thereby retain dissolved carbon and dissolved carbon monoxide within molten bath system 44.

In another embodiment, vitreous layer 50 has a lower thermal conductivity than that of first molten metal phase 46 and second molten metal phase 48. Radiant loss of heat from molten bath system 44 is thereby reduced to below radiant loss of heat from molten bath where no vitreous layer is present.

Examples of suitable metal oxides include titanium oxide (TiO), zirconium oxide ($ZrO_2$), aluminum oxide ($Al_2O_3$), magnesium oxide (MgO), calcium oxide (CaO), etc. Other examples of suitable components of vitreous layer 50 include halogens, sulfur, phosphorus, heavy metals, etc. It is to be understood that vitreous layer 50 can include more than one metal oxide. Vitreous layer 50 is fluid and monatomic species and other gases can pass across vitreous layer 50 from molten bath system 44.

Vitreous layer 50 is formed by directing suitable components, such as metals, metal oxides, halogens, sulfur, phosphorus, heavy metals, fluxes, sludges, etc., from flux source 42 through inlet tube 40 and onto and into molten bath system 44 or from below the surface of the bath. The components form oxides by exposure of the components to an oxidant directed into vessel 12 or from other stable compounds at system conditions by reacting with other less stable components, such as alkali metal or alkaline earth metal cations. Examples of such stable reacting products include calcium fluoride ($CaF_2$) and magnesium phosphate ($Mg(PO_4)_2$). A thin vitreous layer 50 facilitates the passage of carbon dioxide, carbon monoxide, monatomic species and other gaseous species across vitreous layer 50 to gas layer 51.

A gas layer 51 is formed over molten bath 44, or, where there is a vitreous layer 50, over vitreous layer 50. Gas layer 51 can comprise an oxidant directed into upper portion 17 of vessel 12 from an oxidant source 22 through second oxidant inlet tube 38 when chemical processing within gas layer 51 so warrants. In one embodiment, gas layer 51 can also comprise gas formed in molten bath system 44 and in vitreous layer 50. Nucleated gaseous species formed in molten bath 44 and in vitreous layer 50 can react with the oxidant in gas layer 51 or other materials, preferably organic, passing through gas layer 51. Gases in gas layer 51 are directed out of vessel 12 through hot gas off-take 16 by suitable means. Introduction of the oxidant to vessel 12 through second oxidant inlet tube 38 and removal of gas from vessel 12 through hot gas off-take 16 are conducted at rates suitable to maintain an oxidant partial pressure in vessel 12 which is sufficient to substantially oxidize monatomic species leaving molten bath system 44 and to form a gas layer 51 above vitreous layer 50.

In one embodiment, a feed gas and a suitable oxidant are directed from feed gas source 28 and oxidant source 22 through tuyere tube 18 into molten bath system 44 at bottom portion 19 of vessel 12. Suitable oxidants are those which can react with hydrogen to form water and which can react with carbon to form carbon monoxide and carbon dioxide under the conditions of molten bath system 44. Examples of suitable oxidants include oxygen gas, monatomic oxygen, diatomic oxygen ($O_2$), iron oxide, copper oxide, etc. Feed gas is contacted with molten bath system 44 and thereby exposed to conditions sufficient to catalytically convert carbon in the carbon-containing gas to free radicals of carbon and to convert hydrogen in the feed to free radicals of hydrogen.

"Catalytic conversion," as that term is used herein, means that molten bath system 44 sufficiently weakens the bonds between atoms in the feed to facilitate bond cleavage and to cause the hydrogen and carbon components of the hydrogen- and carbon-containing feed to be converted to free radicals of hydrogen and carbon, respectively, at the molten bath system conditions.

Suitable hydrogen- and carbon-containing feed gases include, for example, hydrocarbons, etc. In addition to hydrogen and carbon, feed 52 can contain other atomic constituents, such as halides and metals.

The feed gas and the oxidant are directed through tuyere tube 18. In one embodiment, the oxidant and feed gas are fed to molten bath system 44 simultaneously and conjointly. The oxidant and feed gas can be fed at a rate which is sufficient to form an emulsion of immiscible first molten metal 46 and second molten metal phase 48. In an alternate embodiment, first molten metal phase 46 can form a lower layer and second molten metal phase 48 can form an upper layer of molten bath system 44 adjacent to and above first molten metal phase 46. Vitreous layer 50 is disposed adjacent to and above second molten metal phase 48 to form an upper layer of molten bath system 44.

Free radicals of hydrogen and carbon form in first molten metal phase 46 and in second molten metal phase 48. These free radicals are dissolved in first and second molten metal phases 46,48. It is to be understood, however, that the free radicals can form complexes with the metals of molten bath system 44, such as iron carbide ($Fe_3C_4$), or dissolved diatomic species, such as hydrogen molecules ($H_2$). References to hydrogen and carbon, when dissolved in first or second molten metal phases 46,48, refer to these elements as free radicals, diatomic compounds, complexes, or some other equivalent form.

Also, because the solubility of carbon is higher in first molten metal phase 46 than in second molten metal phase 48, molten bath system 44 causes a greater amount of carbon in the feed to be catalytically converted to dissolved carbon in molten bath system 44 than in a molten bath of about equal volume, but which includes only second molten metal phase 48. This increased conversion of carbon to dissolved carbon increases the rate at which hydrogen is converted to dissolved hydrogen in molten bath system 44.

Carbon is less soluble in second molten metal phase 48 than in first molten metal phase 46. Contact between first molten metal phase 46 and second molten metal phase 48 causes transfer of dissolved carbon from second molten metal phase 48 to first molten metal phase 46. A substantial portion of dissolved carbon formed by conversion of carbon in the feed gas thereby accumulates in first molten metal phase 46.

In addition to dissolved hydrogen and dissolved carbon, other dissolved constituents of the feed gas are also formed. These other constituents can at least partially dissolve in first molten metal phase 46, second molten metal phase 48 or vitreous layer 50. The relative amount of each dissolved constituent in the molten metals and vitreous layer 50 is dependent upon the relative solubility of each of those elements in the metals and other components selected for inclusion in molten bath system 44 and vitreous layer 50. The dissolved constituents can react exothermically with other components in molten bath system 44 and vitreous layer 50 to thereby generate heat and form reaction products which are stable at molten bath system 44 conditions and within molten bath system 44 or vitreous layer 50.

Alternatively, dissolved species other than hydrogen and carbon can be substantially insoluble in molten bath system 44 and vitreous layer 50, whereby the species migrate within molten bath system 44 and vitreous layer 50 to gas layer 51 above vitreous layer 50. Oxidant which is introduced into upper portion 17 of vessel 12 through second oxidant inlet tube 38 reacts with these species to form gaseous oxides. The gaseous oxides are removed from vessel 12 through hot gas off-take 16. In addition, compounds, including triplet carbon monoxide, can contribute to formation of other dissolved species from the feed.

In another embodiment, feed 52 is introduced to molten bath system 44 through feed inlet 14. Examples of feed 52 which are suitable for introduction to molten bath system 44 through feed inlet 14 include paper, lumber, tires, coal, etc. Inorganic feeds may also be introduced through feed 52. Suitable examples of inorganic feeds include, but are not limited to, metals and their oxides, sulfides and halides. Feed introduced through feed inlet 14 can be in solid or liquid form. In addition to hydrogen and carbon, feed 52 can comprise other atomic constituents, such as halides, metals, etc.

Feed 52 directed through feed inlet 14 contacts vitreous layer 50, if a vitreous layer is present, or molten bath system 44. Contact of the feed with molten bath system 44 or vitreous layer 50 exposes the feed to conditions sufficient to convert hydrogen and carbon in the feed to dissolved hydrogen and dissolved carbon, respectively, and to convert other atomic constituents to their respective stable species, as defined under the conditions of the bath.

Conversion of hydrogen, carbon and other atomic constituents to their respective dissolved species can be caused by exposure of the carbon-containing feed to hydrogen, carbon, and other dissolved species already converted from carbon-containing feed, by catalytic conversion during exposure to molten bath system 44, or by both mechanisms A substantial portion of the hydrogen and carbon migrates through vitreous layer 50 and contacts molten bath system 44. Other constituents either react with the oxidant in the gaseous layer 51 to form gaseous oxides which dissolve into vitreous layer 50 or dissolve into molten bath system 44. The relative amounts of chemical moieties, including monatomic species, in vitreous layer 50 and in first molten metal phase 46 and second molten metal phase 48, are at least partially dependent upon the relative solubility of each chemical constituent in the metals, metal oxides and other components selected for use in molten bath system 44.

In one embodiment, the solubility of carbon in vitreous layer 50 and in second molten metal phase 48 is less than in first molten metal phase 46. Carbon, therefore, upon contact with first molten metal phase 46, preferentially dissolves in first molten metal phase 46. Therefore, a substantial portion of the dissolved carbon formed in molten bath system 44 is directed to first molten metal phase 46. Further, the increased solubility of carbon in first molten metal phase 46 causes the amount of dissolved hydrogen formed in the feed to also increase.

At least a portion of the oxidant directed into bottom portion 19 of vessel 12 through tuyere tube 18 contacts first molten metal phase 46 and dissolved carbon therein. In one embodiment, the stoichiometric ratio of the oxidant introduced to apparatus 10 to the oxidizable components of the feed is greater than about 1:1. At least a portion of the oxygen which contacts first molten metal phase 46 and the dissolved carbon in first molten metal phase 46 reacts with the carbon to form carbon monoxide because the free energy of oxidation of the metal in first molten metal phase 46 is higher than that of oxidation of carbon to form carbon monoxide.

Optionally, second molten metal phase 48 has a free energy of oxidation which is greater than that of the oxidation of carbon monoxide to form carbon dioxide. In this embodiment, formation of carbon monoxide in first molten metal phase 46 and contact of first molten metal phase 46 with second molten metal phase 48 causes a substantial portion of the carbon monoxide formed to migrate to second molten metal phase 48. A substantial portion of the carbon monoxide in second molten metal phase 48 contacts at least a portion of the oxidant introduced to molten bath system 44 through tuyere tube 18 and reacts with the oxidant to form carbon dioxide because the free energy of oxidation of the metal in second molten metal phase 46 is higher than that of oxidation of carbon monoxide to form carbon dioxide.

Formation of carbon dioxide in second molten metal phase 48 causes a substantial portion of the carbon dioxide formed to migrate, such as by diffusion from second molten metal phase 48 through vitreous layer 50 to gas layer 51. Carbon dioxide in gas layer 51 is then directed out of apparatus 10 through hot gas off-take 16.

Heat released by exothermic reaction of atomic carbon to carbon monoxide and by exothermic reaction of carbon monoxide to carbon dioxide can provide heat for endothermic formation of additional dissolved carbon and other atomic constituents of the carbon-containing feed. Exothermic reaction of other monatomic species formed from other atomic constituents of the carbon-containing feed can also provide heat for continued generation of dissolved atomic species and for other endothermic reactions in molten bath system 44, in vitreous layer 50, and in gas layer 51.

The rate at which the oxidant is introduced to molten bath system 44 is also sufficient to cause dissolved hydrogen, specifically diatomic hydrogen ($H_2$), in second molten metal phase 48 to oxidize and form water. The water subsequently volatilizes and escapes from molten bath system 44 into gas layer 51. Removal of the dissolved hydrogen from second molten metal phase 48 by oxidation causes dissolved hydrogen, formed in first molten metal phase 46, to nucleate and migrate, generally as diatomic hydrogen ($H_2$), to second molten metal phase 48 for subsequent oxidation to form additional water vapor.

Oxidation of dissolved carbon in first molten metal phase 46 and oxidation of dissolved hydroxy species in second molten metal phase 48 together cause migration of carbon monoxide and of dissolved hydrogen out of first molten metal phase 46, thereby allowing subsequent formation of dissolved carbon in first molten metal phase 46. Increased formation of dissolved carbon in first molten metal phase 46, which is a consequence of the relatively high solubility of carbon in first molten metal phase 46, as compared to that of second molten metal phase 48, causes the generation of dissolved hydrogen to also increase. The increased generation of dissolved hydrogen in first molten metal phase 46 and its subsequent migration to second molten metal phase 48, which is a result of oxidation of dissolved hydrogen in second molten metal phase 48, causes the rate at which hydrogen in hydrogen-and carbon-containing feed is converted to water vapor to significantly increase, compared to a molten bath which includes only second molten metal phase 48.

Heat released by exothermic reactions, such as by formation of carbon monoxide, carbon dioxide and water, within molten bath system 44, vitreous layer 50 and gas layer 51, can also be transferred out of apparatus 10. In one embodiment, heat is conducted through vessel wall 54 to coil 56, covered by a suitable insulation 58, and containing a suitable heat transfer medium, such as water or liquid metal. The heat transfer medium is circulated through coil 56 to thereby transfer heat from molten bath system 44 to power generating means 60. An example of a suitable power generating means is a steam turbine.

In another embodiment, first molten metal phase 46 comprises iron and second molten metal phase 48 comprises copper. Under quiescent conditions, first molten metal phase 46 forms an upper layer and second molten metal 48 forms a lower layer adjacent to and immediately below the upper layer. The molten copper and molten iron form separate layers because they are substantially immiscible and because they have different densities. Turbulence and agitation within the molten metal bath converts the system to an emulsion. The temperature of first molten metal phase 46 and second molten metal phase 48 is about 2500° F. Vitreous layer 50 comprises calcium oxide (CaO), silicon dioxide ($SiO_2$) aluminum oxide ($Al_2O_3$). Typically, the amount of calcium oxide in vitreous layer 50 is about 40%, the amount of silicon dioxide is about 40% and the amount of aluminum oxide is about 20%. Vitreous layer 50 is disposed adjacent to and immediately above the upper, second molten metal layer.

Chlorobenzene ($C_6H_5Cl$), as a hydrogen- and carbon-containing feed gas, and a suitable oxidant are directed through tuyere tube 18 continuously and, optionally, conjointly, into the lower layer. The carbon, hydrogen and chlorine in the chlorobenzene are catalytically converted by exposure to the molten iron to dissolved carbon, hydrogen and chlorine in first molten metal phase and second molten metal phase. Introduction of the oxidant into molten bath system 44 causes dissolved carbon in first molten metal phase to react with the oxidant to form carbon monoxide. The reaction of dissolved carbon with the oxidant is exothermic, thereby releasing heat for continual endothermic catalytic conversion of chlorobenzene to dissolved carbon, hydrogen and chlorine in the first molten metal phase.

Figure 2:
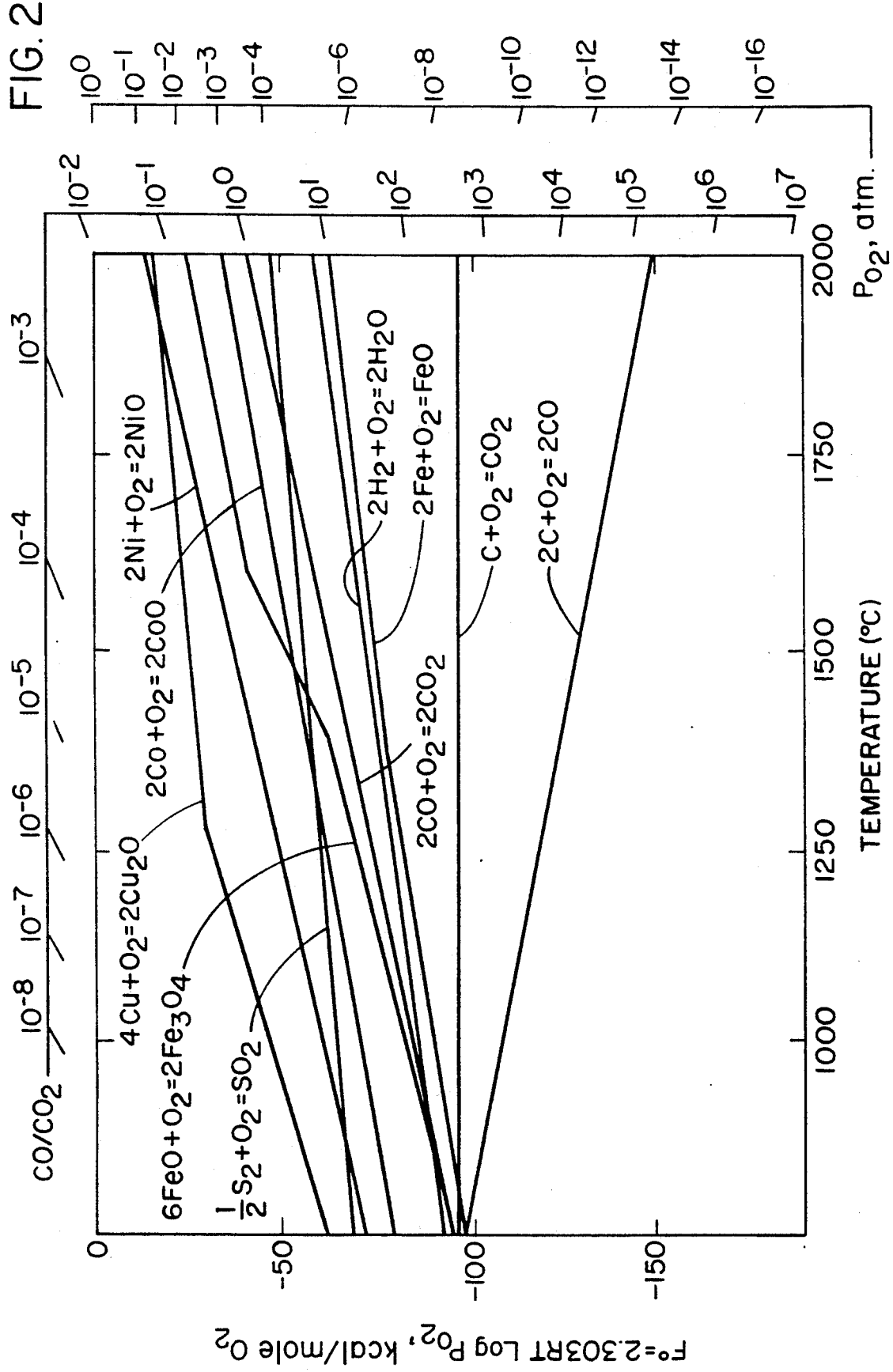
FIG. 2 is a plot of free energies of oxidation of metals suitable for use with the present invention, of the oxidation of carbon to carbon monoxide and to carbon dioxide, and of the oxidation of hydrogen to form water.

As can be seen in FIG. 2, the free energy of oxidation of iron is greater than that of conversion of atomic carbon to carbon monoxide and less than that of the oxidation of hydrogen to form water at temperatures which are about 800° C. Therefore, at least a portion of oxygen introduced to the molten iron will react with the carbon to form carbon monoxide rather than form iron oxide (FeO), at these temperatures and pressures of operations.

Accumulation of carbon monoxide in the molten iron caused by continuous introduction of chlorobenzene and a suitable oxidant to the molten iron, and contact between the molten iron and molten copper, will cause carbon monoxide to migrate from the molten iron to the molten copper. Also, copper has a lower solubility for carbon than does iron. Therefore, carbon will preferentially dissolve in the molten iron phase rather than in the molten copper phase. As discussed above, continued oxidation of dissolved carbon to form carbon monoxide and subsequent migration of the carbon monoxide out of the first molten metal phase will cause dissolved hydrogen to accumulate in the first molten metal phase and to migrate from the first molten metal phase to the second molten metal phase.

As can be seen in FIG. 2, the free energy of oxidation of copper at the temperature of molten bath system 44 is greater than that of oxidation of diatomic hydrogen ($H_2$) to form water ($H_2O$). Therefore, at least a portion of the oxygen in the molten copper phase will react with diatomic hydrogen ($H_2$) in the second molten metal phase to form water rather than react with copper to form copper oxide ($Cu_2O$).

Dissolved hydrogen can also be converted to hydroxide free radical species (OH) in the molten copper phase. Referring again to FIG. 1, the hydroxide species can be directed from the molten copper phase to vitreous layer 50 and into gas layer 51. Oxidant directed through second oxidant inlet tube 38 can thereby react with nucleated hydroxide free radical species to form water vapor, which is then removed from apparatus 10 through hot gas off-take 16.

Dissolved chlorine formed in molten bath system 44 can migrate, such as by diffusion through molten bath system 44 to vitreous layer 50, where it can react with calcium oxide to form calcium chloride ($CaCl_2$). Dissolved chlorine can also be directed into gas layer 51 to contribute to conversion of carbon-containing feed directed into apparatus 10 through feed inlet 14.

In conjunction with the above, it is to be understood that first molten metal phase 46 and second molten metal phase 48 of apparatus 10 can be selected so that other atomic constituents, for example, hydrogen, have greater solubility in second molten metal phase 48 than in first molten metal phase 46. The ratio of carbon dioxide and water formed in second molten metal phase 48 will be defined by relative rate of reaction as well as other physiochemical properties describing second molten metal phase 48.

The basic concept involves the catalytic extraction of the dissolvable chemical species from select disposable materials containing hydrogen, carbon, halides, metals, and the like, into attending phases of appropriate chemical composition. The transfer of mass, chemical energy and latent heat across phase boundaries is accomplished by converting these species to chemical moieties demonstrating lower solubility to the parent phase and preferential solubility to alternative phase(s) comprising the reaction system. The introduction of reactants bearing carbon, oxygen, hydrogen, halides, sulfur, and metals is suitable for this purpose.

The partitioning and transfer of mass, heat, and chemical energy to the attending phases will be determined by the relative solubilities of each phase to the chemical moieties and the chemical environment imposed on these species by the associated phase. The associated behavior of a phase and hence its chemical environment is defined by the characteristic physiochemical properties which specify it. Defining properties typically include composition, temperature and pressure. When the environment specified by the physiochemical properties of the parent phase prevent the liberation of chemical energy to the phase, this (potential) energy may still be released into other attending phases provided their chemical disposition is favorable in that regard. As shown earlier, chemical disposition may be altered through compositional changes, including reactant injection, temperature and pressure changes, and the like.

For example, consider a reaction system comprised of Cr in phase 1, Cu in phase 2, metal oxides such as CaO, $SiO_2$, $Al_2O_3$ in phase 3, and gas residues to the space immediately above phase 3 and in contact with it in phase 4. The injection of chlorobenzene into phase 1 would result in the catalytic extraction of C, H, and Cl by that phase. The transfer of these species and the associated energies to adjacent energies is accomplished by reactant injection. The introduction of $O_2$ into phase 1 converts exothermically C to CO and transfers CO to phase 2. The presence of oxygen in phase 2 exothermically transforms CO to $CO_2$ and dissolved hydrogen, H to OH. These species may pass through phase 3 into phase 4 where the OH radical still contains chemical energy due to its radical state. If the chemical environment of phase 2 is aggressive towards hydroxyl radical, OH, it may further react to form $H_2O$ in phase 2 with the attending energy release. Chlorine passing through phase 3 may be captured by the CaO present (or injected as a reactant) in phase 3 as $CaCl_2$. Optionally it may be allowed to pass into phase 4 to accelerate decomposition of materials residing in phase 4 through free radical reaction.

The reaction system described above affords the transfer to thermally excited CO from phase 1 to phase 2 and optionally phase 3 and 4 through selective oxygen partial pressure orchestration. The transfer of CO from one phase to another phase, with oxidation occurring in the latter phase, effects an energy transfer from the first phase to the second phase. The passage of CO into phase 4, allows it to act as a radical scavenger to initiate material conversion and decomposition with the evolution of heat when the chemical environment of phase 4 supports radical character. Carbon monoxide may also abstract hydrogen (and other atoms) in a known manner when the enthalpy of the environment excites it to its triplet state. Triplet states having unpaired electrons are known to exhibit open shell or free radical behavior.

The basic concept is again illustrated as follows. By providing an oxygen deficient reaction environment immediately above and in contact with the water and other hydrogen bearing sources into the bath will produce monatomic hydrogen and oxygen atoms (H and O) and hydroxyl radical in phase n. These reactive species, generated in the liquid phase, will rapidly migrate from phase n-1 and initiate the decomposition step of organic materials passing through phase n. We prefer to maintain a chemical environment of excited atoms and radicals which serve to abstract terminal atoms, such as hydrogen, or induce homolytic bond cleavage within the chosen material. The propagation of new monatomic species, resulting from these abstractions and cleavages enhance the propagation of new monatomic species that can combine with the dioxygen to support attending transformation reactions. Oxygen atoms also known to insert into covalent chemical bonds in the materials with an evolution of heat corresponding to the bond dissociation energy of a covalent C—O, H—O, N—O, etc.

Equivalents

Those skilled in the art will recognize, or be able to ascertain using no more than routine experimentation, many equivalents of the invention described specifically herein. Such equivalents are intended to be encompassed in the scope of the following claims.

I claim:

1. A method for converting a hydrogen component in a hydrogen- and carbon-containing feed to dissolved hydrogen and for oxidizing the dissolved hydrogen to form water, comprising the steps of:
   a) introducing the feed to a molten bath system having,
      1) a first molten metal phase for converting hydrogen and carbon components in the feed to dissolved hydrogen and dissolved carbon, said first molten metal phase comprising a first metal having a free energy of oxidation, at the molten bath system conditions, which is less than that of the oxidation of hydrogen to form water and greater than that of the oxidation of carbon to form a carbon oxide, and
      2) a second molten metal phase for oxidizing the dissolved hydrogen formed in the first molten metal phase to form water, the second molten metal phase being substantially immiscible in the first molten metal phase and in contact with the first molten metal phase, the second molten metal phase being distributed, relative to the first molten metal phase, to cause a substantial portion of the dissolved hydrogen formed in the first molten metal phase to migrate to the second molten metal phase, said second molten metal phase comprising a second metal having a free energy of oxidation, at the molten bath system conditions, which is greater than that of the oxidation of hydrogen to form water, and in which the solubility of carbon is lower than in the first molten metal phase,
      wherein the first molten metal phase causes a greater amount of the carbon component in the feed to be converted to dissolved carbon in the molten bath system than in a molten bath of about equal volume to that of the molten bath system, but which includes only the second molten metal phase, said conversion of the carbon in the first molten metal phase increasing the rate of conversion of hydrogen in the molten bath system to dissolved hydrogen; and
   b) introducing an oxidant to the first molten metal phase and the second molten metal phase of the molten bath system at a rate which is sufficient to cause the dissolved carbon in the first molten metal phase to be oxidized to form a carbon oxide gas, whereby at least a substantial portion of the carbon component in subsequent feed converts to dissolved carbon in the first molten metal phase, and which rate is also sufficient to cause dissolved hydrogen in the second molten metal phase to oxidize and form water, whereby dissolved hydrogen in the first molten metal phase will migrate to the second molten metal phase for subsequent oxidation, thereby converting hydrogen in the hydrogen- and carbon-containing feed to dissolved hydrogen and oxidizing the dissolved hydrogen to form water.

2. The method of claim 1 wherein the molten bath system further includes a vitreous layer.

3. The method of claim 2 wherein the solubility of hydrogen in the vitreous layer is less than that of the first molten metal phase.

4. The method of claim 3 wherein the vitreous layer has a lower thermal conductivity than that of the first molten metal phase and the second molten metal phase.

5. The method of claim 4 wherein the hydrogen- and carbon-containing feed is exposed in the molten bath system to conditions sufficient to cause catalytic extraction of substantially all soluble reducible atomic constituents from the feed, whereby the atomic constituents are converted to dissolved species in the molten bath system.

6. The method of claim 5 wherein the feed is exposed in the molten bath system to at least a portion of the dissolved species, whereby the atomic constituents of subsequent hydrogen- and carbon-containing feed are at least partially extracted from the feed and are thereby converted to additional dissolved species.

7. The method of claim 6 wherein the dissolved species formed by extraction of atomic constituents from the feed include carbon.

8. The method of claim 7 wherein the dissolved species formed by extraction of atomic constituents from the feed further include dissolved halide species.

9. The method of claim 8 wherein the water formed by oxidation of dissolved hydrogen in the molten bath system generates sufficient heat to cause exposure of the feed in the first molten metal phase and the second molten metal phase to convert the feed to dissolved species, including dissolved hydrogen.

10. The method of claim 9 further including the steps of introducing an oxidant above the vitreous layer in an amount sufficient to substantially oxidize nucleated species leaving the molten bath system and to form a gas layer above the vitreous layer.

11. The method of claim 10 wherein the molten bath system is disposed in a vessel and wherein the feed is introduced to the molten bath system at the vitreous layer.

12. The method of claim 9 wherein an oxidant is introduced to the molten bath system through a bottom portion of the vessel.

13. The method of claim 12 wherein the first molten metal phase forms a first layer and wherein the second molten metal phase forms a second layer disposed adjacent to the first layer and above the first layer.

14. The method of claim 13 wherein the oxidant is introduced to the system through the bottom portion of the vessel is directed into the first molten metal phase.

15. The method of claim 12 wherein the second molten metal phase forms a continuous phase and wherein the first molten metal phase is dispersed within the second molten metal phase.

16. The method of claim 15 wherein the first metal is iron.

17. A method for catalytically converting a hydrogen component in a hydrogen- and carbon-containing feed to dissolve hydrogen and for oxidizing the dissolved hydrogen to form water, comprising the steps of:

a) introducing the feed to a molten bath system having, 1) a first molten metal phase for catalytically converting hydrogen and carbon components in the feed to dissolved hydrogen and dissolved carbon, said first molten metal phase comprising a first metal having a free energy of oxidation, at the molten bath system conditions, which is less than that of the oxidation of hydrogen to form water and greater than that of the oxidation of carbon to form a carbon oxide, and 2) a second molten metal phase for oxidizing the dissolved hydrogen formed in the first molten metal phase to form water, the second molten metal phase being substantially immiscible in the first molten metal phase and in contact with the first molten metal phase, the second molten metal phase being distributed, relative to the first molten metal phase, to cause a substantial portion of the dissolved hydrogen formed in the first molten metal phase to migrate to the second molten metal phase, said second molten metal phase comprising a second metal having a free energy of oxidation, at the molten bath system conditions, which is greater than that of the oxidation of hydrogen to form water, and in which the solubility of carbon is lower than in the first molten metal phase, whereby the first molten metal phase causes a greater amount of the carbon component in the feed to be catalytically converted to dissolved carbon in the molten bath system than in a molten bath of about equal volume to that of the molten bath system, but which includes only the second molten metal phase, said catalytic conversion of the carbon in the first molten metal phase increasing the rate of catalytic conversion of hydrogen component of the feed in the molten bath system to dissolved hydrogen; and b) introducing an oxidant to the first molten metal phase and the second molten metal phase of the molten bath system at a rate which is sufficient to cause the carbon in the first molten metal phase to be oxidized to form a carbon oxide gas, whereby at least a substantial portion of the carbon component in subsequent feed is catalytically converted to dissolved carbon in the first molten metal phase, and which rate is also sufficient to cause hydrogen in the second molten metal phase to oxidize and form water, whereby dissolved hydrogen in the first molten metal phase will migrate to the second molten metal phase for subsequent oxidation, thereby catalytically converting the hydrogen component in the hydrogen- and carbon-containing feed to dissolved hydrogen and oxidizing the dissolved hydrogen to form water.

18. In a method for converting a hydrogen component in a hydrogen- and carbon-containing feed to dissolved hydrogen, wherein the feed and an oxidant are introduced to a molten bath, and wherein the feed is exposed in the molten bath to conditions sufficient to cause the molten bath to convert the hydrogen component to dissolved hydrogen:

the improvement comprising introducing the feed into a molten bath system having a first molten metal phase for converting the hydrogen and carbon components in the feed to dissolved hydrogen and dissolved carbon, said first molten metal phase comprising a first metal having a free energy of oxidation, at the molten bath system conditions, which is less than that of the oxidation of hydrogen to form water and greater than that of oxidation of carbon to form a carbon oxide, and a second molten metal phase for oxidizing the dissolved hydrogen formed in the first molten metal phase to form water, the second molten metal phase being substantially immiscible in the first molten metal phase and in contact with the first molten metal phase, the second molten metal phase being distributed, relative to the first molten metal phase, to cause a substantial portion of the hydrogen dissolved in the first molten metal phase to migrate to the second molten metal phase, said second molten metal phase comprising a second metal having a free energy of oxidation, at the molten bath system conditions, which is greater than that of the oxidation of hydrogen to form water, and in which the solubility of carbon is lower than in the first molten metal phase, whereby the first molten metal phase causes a greater amount of the carbon component in the feed to be converted to dissolved carbon in the molten bath system than in a molten bath of about equal volume to that of the molten bath system, but which includes only the second molten metal phase, said conversion of the carbon in the first molten metal phase increasing the rate of conversion of the hydrogen component in the feed to dissolved hydrogen, and introducing an oxidant to the first molten metal phase and the second molten metal phase of the molten bath system at a rate which is sufficient to cause the dissolved carbon in the first molten metal phase to be oxidized to form a carbon oxide gas, whereby at least a substantial portion of the carbon component in subsequent feed converts to dissolved carbon in the first molten metal phase, and which rate is also sufficient to cause hydrogen in the second molten metal phase to oxidize and form water, whereby dissolved hydrogen in the first molten metal phase will migrate to the second molten metal phase for subsequent oxidation, thereby converting the hydrogen component in the hydrogen- and carbon-containing feed to dissolved hydrogen and oxidizing the dissolved hydrogen to form water.

19. An apparatus for converting a hydrogen component in a hydrogen- and carbon-containing feed to dissolved hydrogen and for oxidizing the dissolved hydrogen to form water, comprising:

a) a vessel;

b) a molten bath system disposed in the vessel having, 1) a first molten metal phase for converting hydrogen and carbon components in the feed to dissolved hydrogen and dissolved carbon, said first molten metal phase comprising a first metal having a free energy of oxidation, at the molten bath system conditions, which is less than that of the oxidation of hydrogen to form water and greater than that of oxidation of carbon to form a carbon oxide, and 2) a second molten metal phase for oxidizing the dissolved hydrogen formed in the first molten metal phase to form water, the second molten metal phase being substantially immiscible in the first molten metal phase and in contact with the first molten metal phase, the second molten metal phase being distributed, relative to the first molten metal phase, to cause a substantial portion of the dissolved hydrogen formed in the first molten metal phase to migrate to the second molten metal phase, said second molten metal phase comprising a second metal having a free energy of oxidation, at the molten bath system conditions, greater than that of the oxidation of hydrogen to form water, and in which the solubility of carbon is lower than in the first molten metal phase, whereby the first molten metal phase causes a greater amount of the carbon component in the feed to be converted to dissolved carbon in the molten bath system than in a molten bath of about equal volume to that of the molten bath system, but which includes only the second molten metal phase, said conversion of the carbon in the first molten metal phase increasing the rate of conversion of hydrogen in the molten bath system to dissolved hydrogen; and c) means for introducing an oxidant to the first molten metal phase and the second molten metal phase of the molten bath system at a rate which is sufficient to cause the carbon in the first molten metal phase to be oxidized to form a carbon oxide gas, whereby at least a substantial portion of the carbon component in subsequent feed converts to dissolved carbon in the first molten metal phase, and which rate is also sufficient to cause hydrogen in the second molten metal phase to oxidize and form water, whereby hydrogen in the first molten metal phase will migrate to the second molten metal phase for subsequent oxidation, thereby converting the hydrogen component in the hydrogen- and carbon-containing feed to dissolved hydrogen and oxidizing the hydrogen to form water; and d) means for removing water formed in the molten bath system from the vessel.

20. An apparatus for catalytically converting a hydrogen component in a hydrogen- and carbon-containing feed to dissolved hydrogen and for oxidizing the dissolved hydrogen to form water, comprising:

a) a vessel;

b) a molten bath system disposed in the vessel having, 1) a first molten metal phase for catalytically converting hydrogen and carbon in the feed to dissolved hydrogen and dissolved carbon, said first molten metal phase comprising a first metal having a free energy of oxidation, at the molten bath system conditions, which is less than that of the oxidation of hydrogen to form water and greater than that of oxidation of carbon to form a carbon oxide, and 2) a second molten metal phase for oxidizing the hydrogen in the first molten metal phase to form water, the second molten metal phase being substantially immiscible in the first molten metal phase and in contact with the first molten metal phase, the second molten metal phase being distributed, relative to the first molten metal phase, to cause a substantial portion of the dissolved hydrogen formed in the first molten metal phase to migrate to the second molten metal phase, said second molten metal phase comprising a second metal having a free energy of oxidation, at the molten bath system conditions, greater than that of the oxidation of hydrogen to form water, and in which the solubility of carbon is lower than in the first molten metal phase. whereby the first molten metal phase causes a greater amount of the carbon component in the feed to be catalytically converted to dissolved carbon in the molten bath system than in a molten bath of about equal volume to that of the molten bath system, but which includes only the second molten metal phase, said catalytic conversion of the carbon component of feed in the first molten metal phase increasing the rate of conversion of hydrogen component of feed in the molten bath system to dissolved hydrogen; and means for introducing an oxidant to the first molten metal phase and the second molten metal phase of the molten bath system at a rate which is sufficient to cause the carbon in the first molten metal phase to be oxidized to form a carbon oxide gas, whereby at least a substantial portion of the carbon component of subsequent feed is catalytically converted to dissolved carbon in the first molten metal phase, and which rate is also sufficient to cause hydrogen in the second molten metal phase to oxidize and form water, whereby dissolved hydrogen in the first molten metal phase will migrate to the second molten metal phase for subsequent oxidation, thereby catalytically converting the hydrogen component in the hydrogen- and carbon-containing feed to dissolved hydrogen and oxidizing the dissolved hydrogen to form water; and d) means for removing water formed in the molten bath system from the vessel.

* * * * *